United States Patent Office
3,465,051
Patented Sept. 2, 1969

3,465,051
CHLOROMETHYLATION OF BENZENE COMPOUNDS
Benjamin Pecherer, Montclair, N.J., assignor to Hoffmann-La Roche Inc., Nutley, N.J., a corporation of New Jersey
No Drawing. Filed Dec. 28, 1966, Ser. No. 605,167
Int. Cl. C07c 79/12, 25/04, 25/14
U.S. Cl. 260—646    8 Claims

ABSTRACT OF THE DISCLOSURE

This invention relates to a process for substituting an aromatic compound having at least one benzenoid carbocyclic ring system and at least one replaceable hydrogen on the benzenoid ring system with a chloromethyl group by reacting the aromatic compound with chlorosulfonic acid and para-formaldehyde.

---

This invention is concerned with a novel process for the chloromethylation of aromatic compounds. More particularly, this invention relates to a process for substituting an aromatic compound with a chloromethyl group by reacting the aromatic compound with chlorosulfonic acid and para-formaldehyde.

By the term "aromatic compound," as employed herein, is meant any organic compound having at least one benzenoid carbocyclic ring system and at least one replaceable hydrogen on the benzenoid ring system. The process of this invention is especially effective for chloromethylating nitro- and trifluoromethylbenzenes because of their general resistance to direct chloromethylation with previously known chloromethylating agents. Preferred nitro- and trifluoromethylbenzenes are those of the formula:

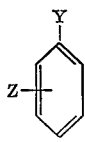

(I)

wherein Y is nitro or trifluoromethyl; Z is hydrogen or Z'; and Z' is halogen (i.e., fluorine, chlorine, bromine, or iodine, preferably chlorine or bromine and most preferably chlorine) or lower alkyl (i.e., branched or straight chain alkyl of from 1 to about 6 carbons, inclusive).

Illustrative examples of the compounds of Formula I include nitrobenzene, o-nitrotoluene, m-nitrotoluene, p-nitrotoluene, 1-nitro-2-ethylbenzene, 1-nitro-2-chlorobenzene, α,α,α-trifluorotoluene, α,α,α-trifluoro-o-xylene, α,α,α-trifluoro-m-xylene, α,α,α-trifluoro-p-xylene, α,α,α-trifluoro-o-ethyltoluene, α,α,α - trifluoro-o-chlorotoluene, and the like. Especially preferred aromatic compounds within the scope of Formula I are those where in Z is Z', and more particularly those wherein Z' is ortho- or para- with respect to Y.

The products of the process of this invention are represented by the formula:

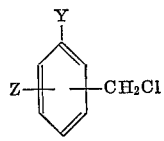

(II)

wherein Y and Z are as defined above, with the proviso that, when Z is hydrogen, the chloromethyl group is meta- with respect to Y and, when Z is Z', the chloromethyl group is ortho- or para- with respect to Z'.

These benzyl chlorides may be further represented by the formulae:

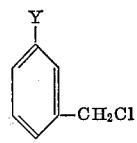

(IIa)

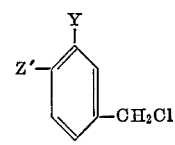

(IIb-1)

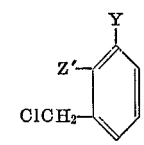

(IIb-2)

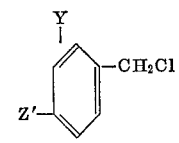

(IIc-1)

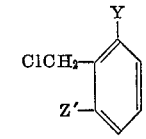

(IIc-2)

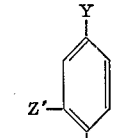

(IId-3)

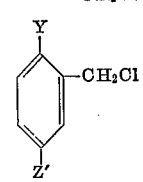

(IId)

Illustrative examples of these compounds include 3-(trifluoromethyl)benzyl chloride, 3-nitrobenzyl chloride, 2-chloro-3-(trifluoromethyl)benzyl chloride, 2-bromo-3-(trifluoromethyl)benzyl chloride, 2-methyl-3-(trifluoromethyl)benzyl chloride, 2-chloro-3-nitrobenzyl chloride, 4-chloro-3-(trifluoromethyl)benzyl chloride, 6-chloro-2-(trifluoromethyl)benzyl chloride, 2-chloro-4-(trifluoromethyl)benzyl chloride, 4-chloro-2-(trifluoromethyl)benzyl chloride, 5-chloro-3-(trifluoromethyl)-benzyl chloride, and the like.

As indicated above, the process of this invention comprises reacting an aromatic compound as defined above with the novel chloromethylating agent comprising para-formaldehyde and chlorosulfonic acid.

By the term "para-formaldehyde" is meant a solid, high molecular weight polyoxymethylene resulting from either (1) the evaporation of an aqueous formaldehyde solution or (2) the acid treatment of alcoholic formaldehyde, which may be generally represented by the formula:

wherein R is either hydrogen [when obtained by process (1)] or an alcohol residue, especially lower alkyl, such as methyl or ethyl [when obtained by process (2)]; and $n$ is normally in the range of from about 40 to about 100. Preferred is the form wherein R is hydrogen.

The molar ratio of reactants is not narrowly critical to the process of this invention. In general, however, it is preferred that the molar ratio of chlorosulfonic acid to benzene derivative (I) be approximately 1:1, for example, in the range of from about 0.9:1 to about 1.1:1. On the other hand, it is generally preferred to employ an excess of para-formaldehyde, with from about 1.1 to about 1.5 molar equivalents of formaldehyde per mol of benzene derivative (I) being normally suitable.

The temperature at which the process of this invention is conducted is not narrowly critical, although reduced temperatures, i.e., below about 20 to 25° C., are normally employed, with temperatures in the range of from —5° C. to +10° C. being especially preferred. However, elevated temperatures of up to about 50° C. or higher can be employed if desired.

Although the reactants can be combined in any order, it is generally preferred to slowly add the chlorosulfonic acid to a vigorously stirred solution of benzene derivative and paraformaldehyde while so controlling the rate of addition that the exothermic heat of reaction can be readily removed and thereby maintain the desired reaction temperature. Normally, this addition rate will be in the range of from about 0.5 to about 5 mols of chlorosulfonic acid per hour, depending upon the method employed to remove the heat of reaction. After completion of the addition of chlorosulfonic acid, the resulting reaction mixture may be maintained at the selected reaction temperature for periods of up to about 24 hours or more to insure completion of the chloromethylation.

The product benzyl chloride is recovered from the reaction mixture by conventional techniques, such as fractionation, chromatography, and the like.

The benzyl chlorides of Formula II are generally known compounds and are valuable intermediates for the synthesis of a variety of organic compounds. For example, the benzyl halides wherein Y is trifluoromethyl may be converted by known techniques to the corresponding phenylacetonitriles, phenylacetamides and phenylacetic acids, all of which display herbicidal activities. These compounds may also be converted in known manner to the corresponding trifluoromethyl-substituted benzaldehydes which are known intermediates for 1-(trifluoromethylphenyl)isopropylamines having utility as anorexigenic agents. The nitro-substituted benzyl chlorides are readily converted to nitrobenzylisothiocyanates having bacteriostatic activity.

EXAMPLE 1

A 12-liter round-bottom flask, equipped with stirrer, thermometer, dropping funnel, and gas vent provided with a drying tube was charged with 2920 grams of α,α,α-trifluorotoluene and 780 grams of flake para-formaldehyde. While maintaining the reaction mixture at 0–2° C., there was added, with vigorous stirring 2330 grams of chlorosulfonic acid over a 5-hour period. After stirring at 0–2° C. for an additional 18 hours, the reaction mixture was poured into a separatory funnel and the lower acid layer was separated. The organic layer was then washed successively with 500-milliliter portions each of water and saturated sodium bicarbonate solution until neutral, dried over anhydrous sodium sulfate, and filtered. Distillation of the filtrate yielded 1584 grams of crude product boiling at 30° C./23 mm. to 120° C./12 mm. and having an index of refraction, $n_D^{25}=1.4509$. On redistillation, there was recovered 1339 grams of 3-(trifluoromethyl)-benzyl chloride, boiling at 68–70° C./12 mm. having an index of refraction, $n_D^{25}=1.4605$.

*Analysis.*—Calculated for $C_8H_6ClF_3$: C, 49.38; H, 3.11; F, 29.29. Found: C, 49.69; H, 3.41; F, 28.98.

EXAMPLE 2

Employing procedures similar to those described in Example 1, o-choloro-α,α,α-trifluorotoluene was reacted with paraformaldehyde and chlorosulfonic acid. After workup of the reaction mixture and distillation, there was obtained a major fraction boiling at 91–110° C./8 mm., $n_D^{25}=1.4933$. Upon redistillation the product boiled at 95–97° C./10 mm. and had an index of refraction, $n_D^{25}=1.4947–1.4951$ and was found to be a mixture of 2-chloro-3-(trifluoromethyl)benzyl chloride and 4-chloro-3-(trifluoromethyl)benzyl chloride in a ratio of about 1:9. These isomers were separated by vapor phase chromatography.

EXAMPLE 3

Employing procedures similar to those described in Example 1, m-chloro-α,α,α-trifluorotoluene was reacted with paraformaldehyde and chlorosulfonic acid. After workup of the resulting mixture and distillation, there was obtained a fraction boiling at 93–105° C./15 mm., $n_D^{25}=1.4849$. On redistillation, there was obtained a mixture of 2-chloro-4-(trifluoromethyl)benzyl chloride and 4-chloro-2-(trifluoromethyl)benzyl chloride boiling at 92–94° C./15 mm., $n_D^{25}=1.4889$, which were separated by vapor phase chromatography.

*Analysis.*—Calculated for $C_8H_5Cl_2F_3$ (on mixture): C, 41.95; H, 2.20; F, 24.88. Found: C, 42.45; H, 2.49; F, 24.60.

EXAMPLE 4

A creased flask was charged with 361 grams of p-chloro-α,α,α-trifluorotoluene and 78 grams of para-formaldehyde flakes. While maintaining the reaction temperature at 25° C., there was added 234 grams of chlorosulfonic acid over 2 hours with stirring. After stirring the mixture for an additional 22–24 hours at 25° C., the lower acid layer was separated and discarded. Anhydrous potassium carbonate was added to the organic layer and the resulting mixture was allowed to stand for 2 hours. After filtration and fractionation, there was obtained a fraction boiling at 90–120° C./18–19 mm., $n_D^{25}=1.4871$. After refractionation of this crude product, there was obtained 2-chloro-5-(trifluoromethyl)benzyl chloride boiling at 98–100° C./21 mm., $n_D^{25}=1.4871$.

*Analysis.*—Calculated for $C_8H_5Cl_2F_3$: C, 41.95; H, 2.20; F, 24.88. Found: C, 42.26; H, 2.62; F, 24.57.

EXAMPLE 5

Employing apparatus and procedures similar to those described in Example 1, 1-chloro-2-nitrobenzene is reacted with para-formaldehyde and chlorosulfonic acid to produce a mixture of 2-chloro-3-nitrobenzyl chloride and 4-chloro-3-nitrobenzyl chloride.

EXAMPLE 6

Employing apparatus and procedures similar to those described in Example 1, 1-chloro-4-nitrobenzene is reacted with para-formaldehyde and chlorosulfonic acid to produce 2-chloro-5-nitrobenzyl chloride.

EXAMPLE 7

Employing apparatus and procedures similar to those described in Example 1, p-nitrotoluene is reacted with paraformaldehyde and chlorosulfonic acid to produce 2-methyl-5-nitrobenzyl chloride.

EXAMPLE 8

Employing apparatus and procedures similar to those described in Example 1, α,α,α-trifluoro-p-xylene is reacted with para-formaldehyde and chlorosulfonic acid to produce 2-methyl-5-(trifluoromethyl)benzyl chloride.

I claim:

1. A process for the chloromethylation of aromatic compounds selected from the group consisting of nitro-substituted benzenes and trifluoromethyl-substituted benzenes wherein said aromatic compounds contain a replaceable hydrogen on the benzene ring comprising reacting said aromatic compound with para formaldehyde and chlorosulfonic acid.

2. A process as claimed in claim 1 wherein said aromatic compound is as defined by the formula:

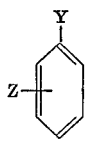

wherein Y is nitro or trifluoromethyl and Z is hydrogen, halogen or lower alkyl.

3. A process as claimed in claim 2 wherein Y is nitro.

4. A process as claimed in claim 2 wherein Y is trifluoromethyl.

5. A process as claimed in claim 4 wherein Z is in a position which is ortho- or para- to the trifluoromethyl.

6. A process as claimed in claim 5 wherein Z is chlorine.

7. A process as claimed in claim 5 wherein the chlorine is ortho- with respect to the trifluoromethyl.

8. The process as claimed in claim 6 wherein the chlorine is para- with respect to the trifluoromethyl.

References Cited

Richter, Textbook of Organic Chemistry, pp. 103 and 106 (1938), John Wiley and Sons, New York, N.Y.

Walker, Formaldehyde, pp. 231–233 (1944) Reinhold Pub. Co., New York, N.Y.

Chemical Abstracts 64 17812h (June 6–20, 1966) citing Netherlands Patent No. 650,376, Oct. 12, 1965.

DANIEL D. HORWITZ, Primary Examiner

U.S. Cl. X.R.

71—105, 113, 118; 260—454, 465, 515, 558, 651, 999